United States Patent [19]

Cavanaugh

[11] 4,035,122

[45] July 12, 1977

[54] SOAP SAVING DEVICE

[76] Inventor: John Daniel Cavanaugh, 2282 Clover Ave., Anaheim, Calif. 92801

[21] Appl. No.: 606,751

[22] Filed: Aug. 22, 1975

[51] Int. Cl.² ...................... B29C 3/00; B29C 27/00

[52] U.S. Cl. ................................. 425/84; 425/318; 425/410; 425/422; 425/521; 249/141

[58] Field of Search .......... 425/500, 521, 410, 422, 425/195, 318, 84; 249/141

[56] References Cited

U.S. PATENT DOCUMENTS

| | | | |
|---|---|---|---|
| 1,782,076 | 11/1930 | Safford, Sr. | 425/318 |
| 2,149,029 | 2/1939 | Mickelson et al. | 425/84 |
| 2,486,347 | 10/1949 | Walker | 425/318 |
| 3,148,430 | 9/1964 | Hanner | 425/318 X |
| 3,838,955 | 10/1974 | Dubbeld | 425/84 |

*Primary Examiner*—Robert L. Spicer, Jr.

[57] ABSTRACT

A light weight portable device that may be utilized to save soap by subjecting the remnants of bars of soap to compression to reform the remnants into a solid bar of desired configuration, and surplus water associated with the remnants being discharged from the device during the reforming operation. After the remnants have been reformed into a solid bar, the bar may be ejected from the device by a simple manual operation. The device is particularly adapted to being formed in its entirety from a polymerized resin such as polyethylene, polypropyline or the like by conventional molding techniques.

4 Claims, 4 Drawing Figures

SOAP SAVING DEVICE

BACKGROUND OF THE INVENTION

1. Field of the Invention

Soap Saving Device.

2. Description of the Prior Art

In the use of a bar of soap, full use of the bar is rarely achieved, for as the bar is used it becomes increasingly thinner and finally breaks up into two or more remnants. Due to the difficulty in using such remnants for bathing and toilet purposes, the remnants are normally discarded even though they include a substantial quantity of soap. Due to the present energy crisis and the desire to utilize fully all natural and manufactured products, it is desirable that such remnants not be discarded but utilized for washing purposes.

A primary object of the present invention is to provide a light weight, portable, inexpensive device in which remnants of soap may be placed, preferably in a moist condition, and the remnants then manually subjected to compression to the extent that they are reformed into a bar of soap of desired configuration, and with surplus water associated with the remnants being separated therefrom during the reforming operation.

Another object of the invention is to supply a device that will encourage the saving and utilization of remnants of bars of soap that previous hereto have been discarded as useless.

Still another object of the invention is to supply a device that will illustrate to children that remnants of bars of soap that were previously considered useless and without value may be reclaimed and reformed into a usable bar of soap with a minimum of effort, and with a resultant saving in the expense of maintaining a household.

A further object of the invention is to provide a soap saving device in which the components comprising the same may be easily separated from one another for cleaning purposes, and easily assembled to permit remnants of bars of soap to be reformed into a new bar.

SUMMARY OF THE INVENTION

The soap saving device includes a housing that defines a vertically extending space, when the device is resting on a horizontal surface, such as defined by a table, shelf or the like. The housing has a platen disposed within the vertically extending space, with the platen also resting on the supporting surface. Remnants of bars of soap, as well as other scraps of soap, may be placed in the vertically extending space to rest on the platen. After sufficient remnants of soap have been positioned in the vertically extending space of the housing to form a bar of soap of substantial size, a plunger is placed in the upper portion of the vertically extending space to rest on these remnants. A cover is now mounted on the plunger to permit the latter to be forced downwardly manually. When force is exerted on the cover and plunger, the space between the platen and plunger is reduced in volume, with the remnants of bars of soap therein being compressed and forced into bonding contact with one another and be reformed into a bar of soap of such size as to be usable for bathing purposes. The remnants of soap, prior to being compressed, are preferably in a moist condition. The platen preferably has a number of spaced apertures therein, as well as the housing and platen at their junction cooperating to provide a number of downwardly extending passages, and these apertures and passages permitting excess water in the remnants to be separated therefrom and flow downwardly through the apertures and passages as the remnants are reformed into a bar of soap.

After the remnants have been reformed into a bar of soap, the cover and plunger are separated from the housing, and the platen is being used to force the reformed bar of soap upwardly out of the housing, to permit the reformed bar to be used for bathing purposes. After the use of the invention as above described, the components comprising the same are washed and dried, reassembled, and then stored for further use in reforming remnants of bars of soap into a new bar.

DESCRIPTION OF THE PREFERRED EMBODIMENT

Figure 1:
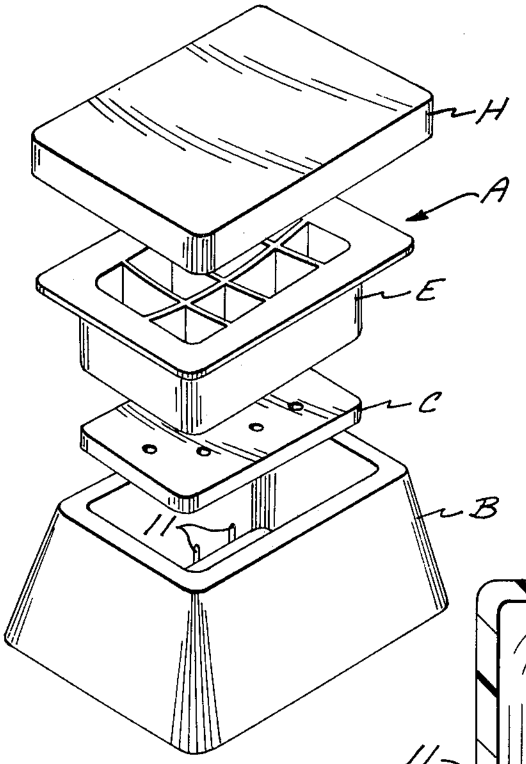
FIG. 1 is a perspective view of the components comprising the soap saving device.
Figure 2:
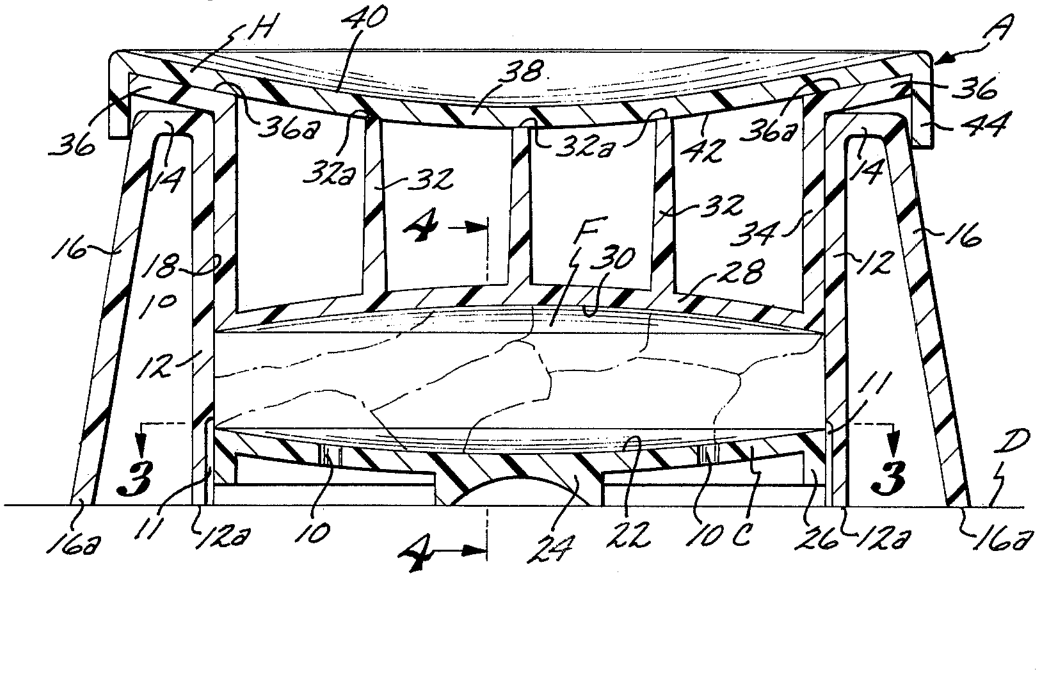
FIG. 2 is a longitudinal cross-sectional view of the soap saving device.

In FIGS. 1 and 2 it will be seen that the soap saving device A is defined by a housing B that has a platen C slidably mounted therein, with both the housing and platen capable of resting on a flat horizontal surface D such as defined by a shelf, table top, or the like. A plunger E is slidably mounted in the housing B and cooperates with the platen C to provide a confined space F of variable volume. Remnants of bars of soap G are placed in the confined space. A cover H rests on the plunger E, with the cover serving to permit a manually exerted force to be exerted on the plunger to compress the remnants of soap G into a reformed bar G′ as shown in FIG. 2. After the reformed bar of soap G′ has been formed, the plunger E and cover H are removed from the housing B, and the platen is then moved upwardly in the housing to eject the reformed bar of soap G′ therefrom. During the reforming of the bar of soap G′, the remnants G that were preferably moist, have excess moisture and water separated therefrom by the water flowing downwardly through apertures 10 in the platen C, as well as flowing downwardly through passages 12 defined between the platen C and housing B, as the compression of the remnants G take place to form the bar of soap G′.

In detail the housing B, when resting on the surface D, is defined by a vertically extending inner shell 12 that has an upper edge from which a continuous lip 14 extends outwardly. The lip 14 on the outer extremity thereof develops into a downwardly and outwardly tapering outer shell 16, which outer shell has a lower edge **16*a* that is horizontally aligned with the edge 12*a* as shown in FIG. 2. The lower edges 12*a* and 16*a* of the inner and outer shells 12 and 16, rest on the horizontal surface D. The inner shell 12 defines a vertically extending space 18** within the interior thereof, and this space, as illustrated in the drawing, being of generally rectangular, transverse cross-section.

Figure 4:
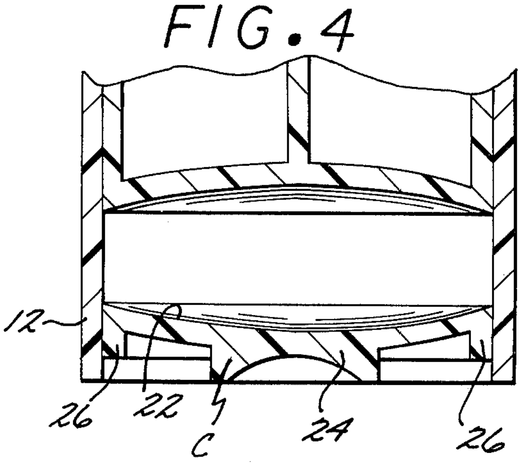
FIG. 4 is a fragmentary transverse cross-sectional view of the device taken on the line 4—4 of FIG. 2.
Figure 3:
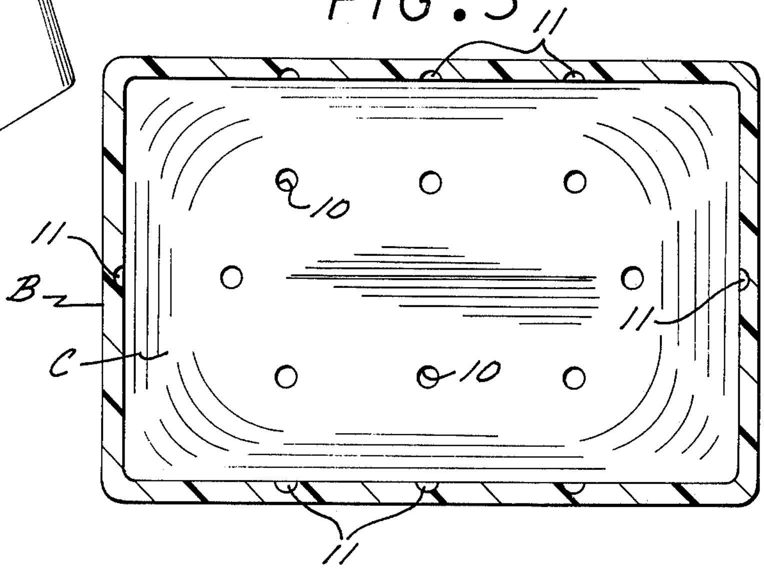
FIG. 3 is a longitudinal cross-sectional view of the device taken on the line 3—3 of FIG. 2.

The platen C, as may best be seen in FIGS. 2 and 4, is formed from a first plate 20 that is slidable within the vertical space 18, with the first plate having an upper concave surface 22 and a thumb engageable lug 24 that projects downwardly from the first plate 20. The outer extremity of the first plate 20 develops into a first short downwardly extending wall 26 that slidably engages the interior surface of the inner shell 12 end is slidable within the vertically extending space 18. The platen C, like the housing B, is preferably moulded by conventional means from a suitable polymerized resin, such as polyethylene or polypropylene or the like.

The plunger E is also formed from a polymerized resin and includes a second plate 28 that has a lower concave surface 30 and a number of spaced reinforcing ribs 32 that extend upwardly from the second plate 28, as shown in FIG. 2. A second continuous wall 34 extends upwardly from the second plate 28 as shown in FIG. 2, and the second wall 34 developing into a flange 36 that extends outwardly therefrom. The ribs 32 and flange 36 have upper surfaces **32*a* and 36*a* that are so aligned that they may be pressure contacted by a lower convex surface 42 of a third plate 38 that partially defines the cover H. The third plate 38 has a concave upper surface 40. A continuous rib 44 extends downwardly from the periphery of the third plate 38 and is slidably movable relative to the other extremity of the flange 36**.

In FIG. 2 it will be seen that the upper concave surface 22 and lower concave second surface 30 cooperate to define a confined space F of variable volume in which the remnants G of soap, shown in FIG. 2 in phantom line, are disposed to be reformed into a bar of soap G' when the volume of the confined space F is reduced. This reduction in volume of the confined space F is achieved by moving the cover H and plunger E downwardly within the housing B when the housing and platen C are supported on the horizontal surface D.

As the compression of the remnants of bars of soap G takes place in the confined space F, surplus water associated with the remnants of soap drains downwardly through the apertures 10 and passages 11. After the bar of soap G' has been formed by the above described process, the plunger E and cover H are removed from the housing B, and manual force is exerted on the lug 24 to force the platen C and bar of soap G' upwardly through the housing B to discharge therefrom. The components comprising the soap saving device A are then washed and dried, reassembled as shown in FIG. 2, and stored into a convenient place until again needed.

The use and operation of the invention A has been described previously in detail and need not be repeated.

I claim:

1. A device for use in saving soap by reforming remnants of bars of soap and scrap soap into a bar of usable size, said device including:

a. housing that defines a vertically extending space when said housing is resting on a horizontal surface, said housing having a plurality of vertically directed recesses formed in a lower portion thereof;

b. a platen slidably movable in said vertically extending space, said platen being adapted to occupy a first position in said vertically extending space wherein it is in contact with said surface, said platen when in said first position being capable of supporting said remnants of bars of soap and scrap soap thereon within the confines of said vertically extending space, and said platen having a plurality of spaced apertures formed therein, and said platen including a first plate having a first concave upper surface and a first side wall that extends downwardly from the periphery of said first plate, said first side wall slidably engaging the interior of said housing and when said platen is in said first position said first side wall cooperates with said recesses to define vertical passages through which water can escape during the reforming of said remnants and scraps of soap into a usable bar; and, c. a plunger slidably mounted in an upper portion of said vertically extending space, said plunger and platen when disposed in said housing cooperatively defining a confined space of variable volume therebetween wherein said remnants and scraps of soap are disposed, said plunger when manually forced towards said platen reducing the volume of said confined space and compressing said remnants and scraps of soap to reform the same to a usable bar of soap that has the volume and shape of said confined space of reduced volume, with any surplus water associated with said remnants and scraps flowing therefrom through said apertures during the reforming of said remnants and scraps into said usable bar of soap, with said usable bar of soap after formation thereof being ejected from said housing by removing said plunger from said housing and then manually moving said platen from said first position towards the position previously occupied by said plunger.

2. A device as defined in claim 1 wherein said platen includes:

d. first means on said platen that may be engaged by a portion of a user's hand to force said platen upwardly in said housing.

3. A device as defined in claim 2 wherein said plunger includes:

f. a second plate having a second concave lower surface disposed adjacent said platen;

g. a second side wall that extends upwardly from the periphery of said second plate, said second side wall being slidably movable in said housing;

h. a plurality of spaced reinforcing ribs that extend upwardly from said second plate; and i. second means that concurrently and removably engage said second side wall and reinforcing ribs, which second means may be subjected to a downwardly directed force to compress said remnants and scraps of soap between said first and second plates into a bar of soap of usable size.

4. A device as defined in claim 3 wherein said second means is a cover that includes:

j. a third plate that rests concurrently on said second side wall and reinforcing ribs; and k. a continuous flange that extends downwardly from the periphery of said third plate over said second side wall.

* * * * *